Feb. 19, 1929.
G. VENTURA
1,702,675
AUTOMOBILE BUMPER
Filed Sept. 20, 1928
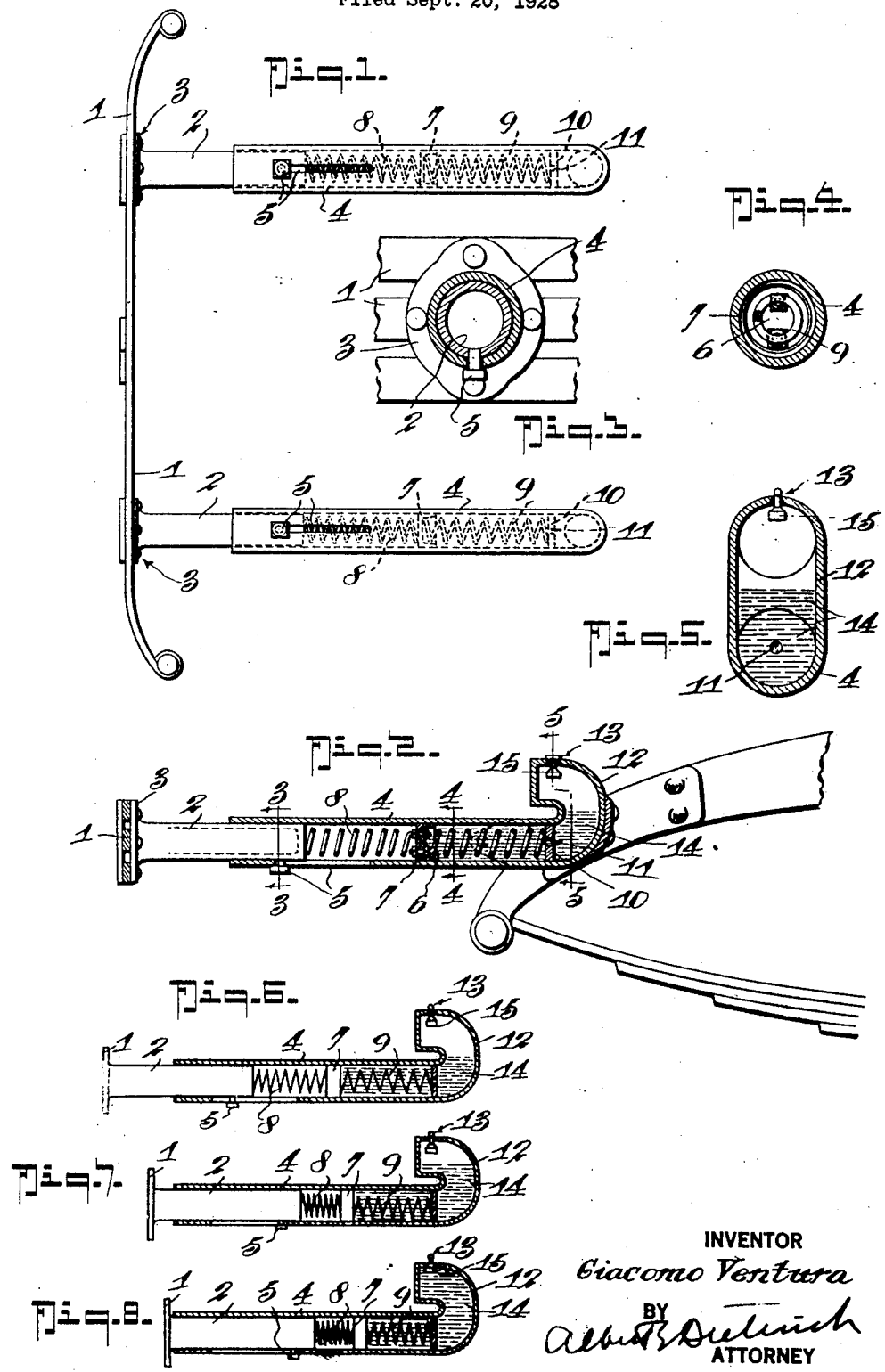
INVENTOR
Giacomo Ventura
BY
ATTORNEY Patented Feb. 19, 1929.

1,702,675

UNITED STATES PATENT OFFICE.

GIACOMO VENTURA, OF LOS ANGELES, CALIFORNIA.

AUTOMOBILE BUMPER.

Application filed September 20, 1928. Serial No. 307,178.

The invention generally relates to shock absorbing devices, principally to that type of such devices known as automobile bumpers, and the said invention primarily has for its object to provide an improved bumper in which a combination of spring and hydraulic shock buffer structure is employed.

In its more detailed nature the invention resides in the provision of an improved bumper comprising a bumper body and mounting members adapted to telescope upon impact of the bumper body with a resisting obstruction, said telescoping members having therein initial shock absorbing springs and other combined spring and hydraulic heavy shock absorbing devices.

Other objects will in part be obvious and in part be pointed out hereinafter.

To the attainment of the aforesaid objects and ends, the invention further resides in the novel details of construction, combination and arrangement of parts, all of which will be first fully described in the following description, then be particularly pointed out in the appended claims, reference being had to the accompanying drawings, in which:—

Figure 1 is an inverted plan view of the invention.

Figure 2 is a cross section of a bumper constructed in accordance with the invention and mounted for use, one of the telescopic mounting members being shown in longitudinal section.

Figures 3, 4 and 5 are cross sections taken on the lines 3—3, 4—4 and 5—5 on Figure 2.

Figures 6, 7 and 8 are diagrammatic sections illustrating three different shock absorbing conditions.

In the drawings, in which like numerals of reference indicate like parts in all of the figures, 1 designates the bumper which may be designed in any suitable manner and may comprise a single or a number of cross leaves secured together in any manner desired. Suitably spaced tubes or rods 2 are secured to the bumper at 3 and the said members 2 telescope into tubular members 4 and are slot and pin connected thereto as at 5 to limit the telescopic movement of the parts.

In each member 4 a piston or plunger 6 is slidably mounted, said pistons each including a packing washer 7 of leather, or other suitable material, to cause the said pistons to engage the tubular member fluid-tight.

A light coil spring 8 is mounted in each member 4 between the piston and the opposed end of the member 2 and a similar but heavier spring 9 is interposed between the other face of the piston and an abutment wall 10 fixedly mounted in the member 4 and provided with a bleed opening 11, the purpose for which will later be described.

The end of the member 4 opposite that which receives the member 2 is bent upwardly and back upon itself as at 12 and at the uppermost point thereof is provided with an air port 13.

That portion of each member 4 beyond the piston 6—7 and at each side of the wall 10 constitutes a fluid chamber.

In each fluid chamber formed as above described is provided a quantity of glycerine, or other fluid of suitable consistency, indicated at 14.

In operation the port 13 serves to provide for the necessary ingress and egress of air into and out of the fluid chamber, and to overcome any tendency of the fluid 14 to pass out through the air port 13, I provide a float valve 15 which will normally hang suspended, as shown in Figures 2 and 5 of the drawings, but when engaged by the fluid 14 will close the air port.

In operation, when the bumper 1 is engaged by an obstruction, the first shock will be taken up by movement of the members 2 and compression of the light coil springs 8, and if the impact is moderate the compression of the said springs 8 will be sufficient to wholly absorb it.

Heavier shocks, however, will cause movement of the pistons 6—7 and not only the compression of the heavy springs 9 but the forcing of a portion of the glycerine from the chambers in advance of the abutment walls 10 through the small ports or orifices in the said walls and up into the upwardly extended chambers beyond, serving to efficiently and gradually absorb the said shock. Upon release of the engagement, the spring 9 will return the piston to normal and draw the expelled portion of the glycerine back into the chambers in advance of the partition walls, as illustrated in Figure 2.

In Figures 6—7—8 I have shown diagrammatically the position of the parts when absorbing the light shock of a light impact, the moderate shock of an intermediately heavy impact, and the full shock of a heavy impact respectively.

From the foregoing description, taken in connection with the accompanying drawings, it is thought that the novel details of construction, the manner of use and the advantages of my invention will be readily apparent to those skilled in the art to which it appertains.

What I claim is:

1. In shock absorbing bumpers, telescopic mounting members, and combined cushion spring and hydraulic buffer devices mounted in the telescopic members to absorb the shocks of collisions, said devices including a stationary wall having a bleed duct therein and a spring-resisted free piston cooperative therewith.

2. In shock absorbing bumpers, telescopic mounting members, and combined cushion spring and hydraulic buffer devices mounted wholly within the telescopic members to absorb the shocks of collisions, certain of said cushion spring devices being arranged to absorb initial and light shocks and other of said spring devices and the hydraulic devices being arranged to absorb heavier shocks.

3. In shock absorbing bumpers, telescopic mounting members, combined with cushion spring and hydraulic buffer devices mounted in the telescopic members to absorb the shocks of collisions, and means to permit ingress of air into the hydraulic buffer devices and for permitting egress of air only from said hydraulic buffer devices.

4. In shock absorbing bumpers, telescopic mounting members, slot and pin connections to limit the degree to which the telescopic members may move relatively to each other, and combined cushion spring and hydraulic buffer devices mounted wholly within the telescopic members to absorb the shocks of collisions.

5. In shock absorbing bumpers, telescopic mounting members, and combined cushion spring and hydraulic buffer devices mounted in one of the telescopic members and engaged by the other telescopic member.

6. In shock absorbing bumpers, telescopic mounting members, slidable one within the other, a piston slidable in one of the members, a partition wall in one of the members having a bleed duct therein and being spaced from the piston and the adjacent end of the member in which it is mounted to form a fluid chamber at either side of said wall, and a spring engaging the piston and the other of the telescopic members for the purposes specified.

7. In shock absorbing bumpers, telescopic mounting members slidable one within the other, a piston slidable in one of the members, a partition wall in one of said members having a bleed duct therein and being spaced from the piston and the adjacent end of the member in which it is mounted to form a liquid chamber at either side of said wall, a spring engaging the piston and the other of the telescopic members, and means to permit ingress and egress of air into and from the chamber formed between the partition wall and the partition wall carrying member end without permitting escape of liquid from said chamber.

8. In shock absorbing bumpers, telescopic mounting chambers slidable one within the other, a piston slidable in one of the members, a partition wall in one of said members having a bleed duct therein and being spaced from the piston and the adjacent end of the member in which it is mounted to form a liquid chamber at either side of said wall, a spring engaging the piston and the other of the telescopic members, the said partition wall carrying member having the end thereof bent upwardly beyond the said partition wall, and means in the upwardly bent portion of said member to permit ingress and egress of air without permitting escape of liquid.

9. In shock absorbing bumpers, telescopic mounting members slidable one within the other, a piston slidable in one of the members, a partition wall in one of said members having a bleed duct therein and being spaced from the piston and the adjacent end of the member in which it is mounted to form a liquid chamber at either side of said wall, a light coil spring engaging the piston and the other of the telescopic members, another and heavier coil spring interposed between the piston and the partition wall, the said partition wall carrying member having the end thereof bent upwardly beyond the said partition wall, and means in the upwardly bent portion of said member to permit ingress and egress of air without permitting escape of liquid.

10. A bumper comprising an impact member, telescopic shock absorbing mounting members, and means to secure the mounting members in position for use, said mounting devices each comprising a pair of telescopic members, a piston slidable in one of the members, a partition wall in one of said members having a bleed duct therein and being spaced from the piston and the adjacent end of the member in which it is mounted to form a liquid chamber at either side of said wall, a light coil spring engaging the piston and the other of the telescopic members, another and heavier coil spring interposed between the piston and the partition wall, the said partition wall carrying member having the end thereof bent upwardly beyond the said partition wall, and means in the upwardly bent portion of said member to permit ingress and egress of air without permitting escape of liquid.

GIACOMO VENTURA.